United States Patent
Arnold et al.

(10) Patent No.: US 9,858,436 B2
(45) Date of Patent: Jan. 2, 2018

(54) SECURE FORMAT-PRESERVING ENCRYPTION OF DATA FIELDS

(71) Applicant: International Business Machines Corporation, Armonk, NY (US)

(72) Inventors: Todd W. Arnold, Charlotte, NC (US); John C. Dayka, New Paltz, NY (US); Steven R. Hart, Wallkill, NY (US); Geoffrey G. Jackson, San Jose, CA (US); Eysha S. Powers, Wappingers Falls, NY (US); James W. Sweeny, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/844,048

(22) Filed: Sep. 3, 2015

(65) Prior Publication Data
US 2016/0224802 A1    Aug. 4, 2016

Related U.S. Application Data

(63) Continuation of application No. 14/608,540, filed on Jan. 29, 2015.

(51) Int. Cl.
*G06F 12/14*    (2006.01)
*G06F 21/62*    (2013.01)
*G06F 17/30*    (2006.01)

(52) U.S. Cl.
CPC .... *G06F 21/6245* (2013.01); *G06F 17/30312* (2013.01); *G06F 21/6227* (2013.01)

(58) Field of Classification Search
CPC ................................................. G06F 21/6245
(Continued)

(56) References Cited

U.S. PATENT DOCUMENTS

2004/0153458 A1* 8/2004 Noble ................. G06F 11/1464
2005/0244000 A1* 11/2005 Coleman ............... H04L 9/0662
380/44

(Continued)

OTHER PUBLICATIONS

Rogaway, A Synopsis of Format-Preserving Encryption, Mar. 27, 2010, UC Davis, pp. 1-18.*

(Continued)

*Primary Examiner* — Peter Shaw
(74) *Attorney, Agent, or Firm* — Cantor Colburn LLP; William A. Kinnaman, Jr.

(57) ABSTRACT

In one embodiment, a computer-implemented method includes extracting first key derivation data from a first row of data to be stored in a database, where the database includes two or more rows of data. A first encryption subkey is generated, by a computer processor, by combining the first key derivation data with a static key. One or more sensitive fields in each row of the two or more rows of the database are encrypted using a unique corresponding encryption subkey for the row, and the first encryption subkey is unique to the first row among the two or more rows of the database. The one or more sensitive fields in the first row of data are encrypted with format-preserving encryption using the first encryption subkey. The first row of data, including the encrypted one or more sensitive fields, are stored in the database.

4 Claims, 6 Drawing Sheets

(58) Field of Classification Search
USPC .......................................................... 713/189
See application file for complete search history.

(56) References Cited

U.S. PATENT DOCUMENTS

| | | | |
|---|---|---|---|
| 2008/0082834 A1* | 4/2008 | Mattsson ............ | G06F 21/6209 |
| | | | 713/189 |
| 2012/0209884 A1* | 8/2012 | Mattsson ............ | G06F 21/6227 |
| | | | 707/783 |
| 2013/0198525 A1* | 8/2013 | Spies .................. | G06F 21/6227 |
| | | | 713/189 |
| 2014/0108813 A1* | 4/2014 | Pauker ................ | G06F 21/6218 |
| | | | 713/189 |
| 2016/0224795 A1 | 8/2016 | Arnold et al. | |

OTHER PUBLICATIONS

List of IBM Patents or Patent Applications Treated as Related; POU920140208US2, Date Filed: Sep. 3, 2015, pp. 1-2.
Steven R. Hart, et al.,"Format-Preserving Encryption of BASE64 Encoded Data", U.S. Appl. No. 14/968,006, filed Dec. 14, 2015.

* cited by examiner

SECURE FORMAT-PRESERVING ENCRYPTION OF DATA FIELDS

DOMESTIC PRIORITY

This application is a continuation of U.S. patent application Ser. No. 14/608,540, filed Jan. 29, 2015, the disclosure of which is incorporated by reference herein in its entirety.

BACKGROUND

Various embodiments of this disclosure relate to encryption and, more particularly, to format-preserving encryption of data fields.

Encryption is a method to encode data such that only authorized parties can view it. With symmetric encryption, a single key value both encrypts and decrypts the data. The symmetric encryption algorithms used in Advanced Encryption Standard (AES) and Triple Data Encryption Standard (TDES), among others, use a key and with an optional initialization vector (IV) to scramble the data, producing ciphertext in which all bytes appear to be random numeric values from 0-255. The IV is a value incorporated into the encryption, where variation of this value ensures that the resulting ciphertext will vary even when inputting the same plaintext to be encrypted.

These algorithms work on blocks of data having eight or sixteen bytes per block. Thus, when a string is encrypted, the resulting ciphertext becomes binary, and its length grows to a multiple of the block size. While this makes for high security, it can be a problem for information technology systems that need to hold or channel data without actually processing it. Take for example a database in which one of the columns is a plaintext social security number (SSN). Updating the database to now have the SSN encrypted would require a schema change to change the SSN field from text to binary and to increase the size of the field from nine to sixteen bytes, resulting in increased storage usage.

Format-preserving encryption (FPE) exists to address the above issue. FPE encrypts data in place without changing the size or character set of the data being encrypted. In other words, the resulting ciphertext has the same size and character set as the original plaintext data.

There are several accepted FPE methods, including FFX [Radix], VAES3, BPS-BC, and Visa FPE (VFPE). The first three of these accomplish FPE by performing multiple rounds of encryption on the data. While this works, it requires considerable overhead. As a percentage of the entire operation, that overhead can be quite large for small data fields such as social security numbers, credit card numbers, and other sensitive personal data. The last of these methods, VFPE, was designed for performance. It differs from the others in that it is a stream cipher, as opposed to a block cipher, and therefore avoids the need for multiple rounds of encryption. However, VFPE has a drawback in that it is not secure if the key/IV combination is ever reused for multiple plaintext streams.

SUMMARY

In one embodiment of this disclosure, a computer-implemented method includes extracting first key derivation data from a first row of data to be stored in a database, where the database includes two or more rows of data. A first encryption subkey is generated, by a computer processor, by combining the first key derivation data with a static key. One or more sensitive fields in each row of the two or more rows of the database are encrypted using a unique corresponding encryption subkey for the row, and the first encryption subkey is unique to the first row among the two or more rows of the database. The one or more sensitive fields in the first row of data are encrypted with format-preserving encryption using the first encryption subkey. The first row of data, including the encrypted one or more sensitive fields, are stored in the database.

In another embodiment, a system includes one or more computer processors configured to extract first key derivation data from a first row of data to be stored in a database, where the database includes two or more rows of data. The one or more computer processors are further configured to generate a first encryption subkey by combining the first key derivation data with a static key. The one or more sensitive fields of each row of the two or more rows of the database are encrypted using a unique corresponding encryption subkey for the row, and the first encryption subkey is unique to the first row among the two or more rows of the database. The one or more computer processors are further configured to encrypt the one or more sensitive field in the first row of data with format-preserving encryption using the first encryption subkey. The one or more computer processors are further configured to store in the database the first row of data, including the encrypted one or more sensitive fields.

In yet another embodiment, a computer program product for encrypting database data includes a computer readable storage medium having program instructions embodied therewith. The program instructions are executable by a processor to cause the processor to perform a method. The method includes extracting first key derivation data from a first row of data to be stored in a database, where the database includes two or more rows of data. Further according to the method, a first encryption subkey is generated by combining the first key derivation data with a static key. One or more sensitive fields in each row of the two or more rows of the database are encrypted using a unique corresponding encryption subkey for the row, and the first encryption subkey is unique to the first row among the two or more rows of the database. The one or more sensitive fields in the first row of data are encrypted with format-preserving encryption using the first encryption subkey. The first row of data, including the encrypted one or more sensitive fields, are stored in the database.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are encryption systems and methods that utilize the existing VFPE mechanism, but derive a unique encryption subkey per row based on a static key and other key derivation data in the row. VFPE is fast but is not secure if the key/IV combination is ever reused for multiple plaintext streams. This is a serious limitation with respect to database field encryption, because multiple keys would present a management problem in this context. Creating and saving a unique IV for each row or field would require a schema change, adding an additional column to the database to store the unique IV. Embodiments of the present encryption system, however, need not require storage of a unique IV for each row.

Figure 1:
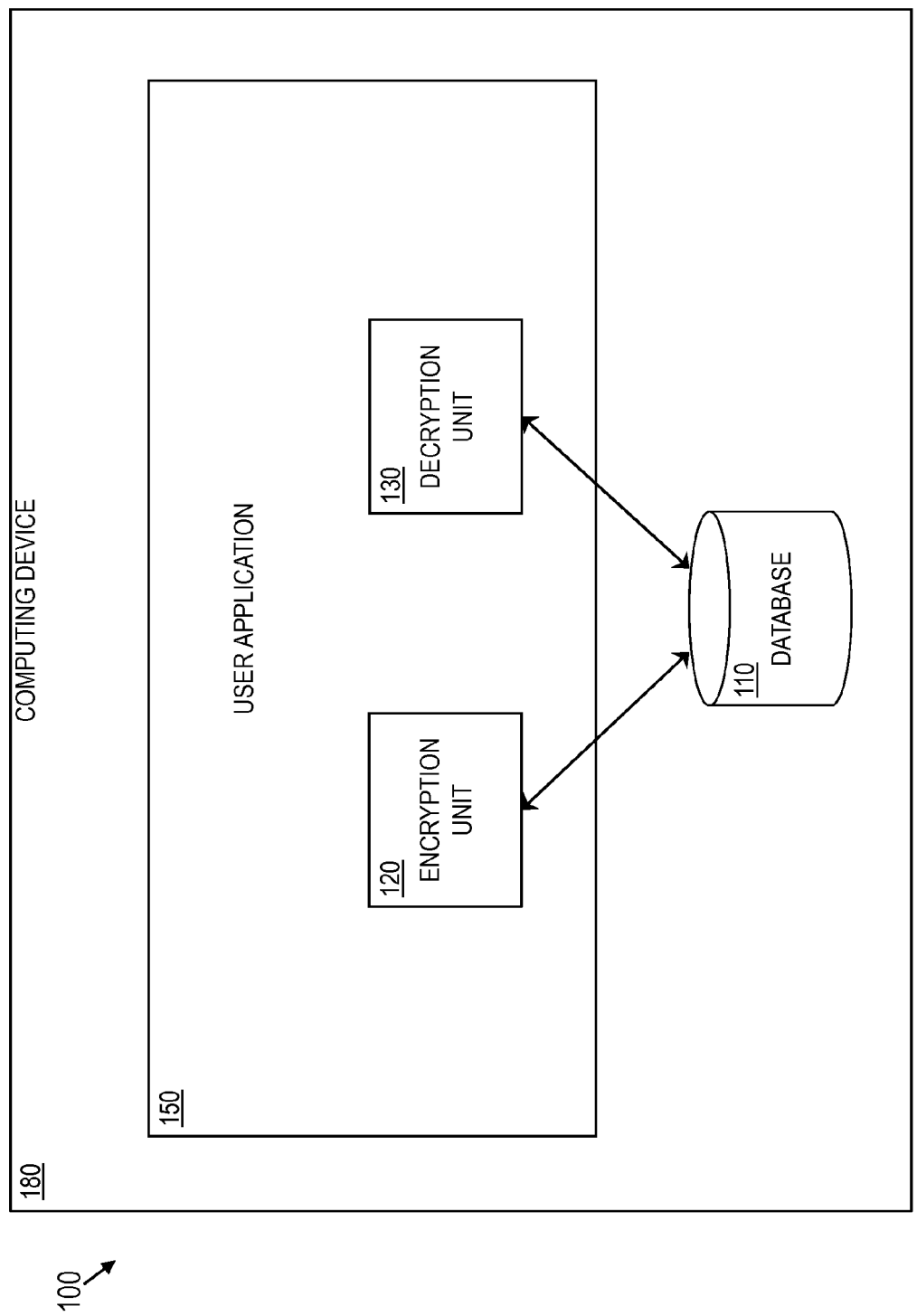
FIG. 1 is a block diagram of an encryption system, according to some embodiments of this disclosure.

FIG. 1 is a block diagram of an encryption system 100, according to some embodiments of this disclosure. The encryption system 100 may include an encryption unit 120 and a decryption unit 130, which may be embodied in hardware, software, or a combination of both. In embodiments according to FIG. 1, these encryption and decryption units 120 and 130 may be embodied in a user application 150, which may access data stored in a database 110. The data stored in the database 110 may be encrypted by the user application 150, which may run on a computing device 180 and may include encryption and decryption units 120 and 130 of the encryption system 100. In other words, before writing data to the database 110, the user application 150 may encrypt the data using the encryption unit 120; and before processing data read from the database, the user application 150 may decrypt that data using the decryption unit 130. As a result, the database 110 may hold encrypted data but need not manage the encryption and decryption of that data. The database 110 may be blind to the fact that encryption is occurring.

Throughout this disclosure, the term "database" refers to a structured data area or repository, such as DB2, information management system (IMS), virtual storage access method (VSAM), or a column-delineated data set or file. Further, the database 110 need not be a relational database, but may be various mechanisms used to store and structure data.

Figure 2:
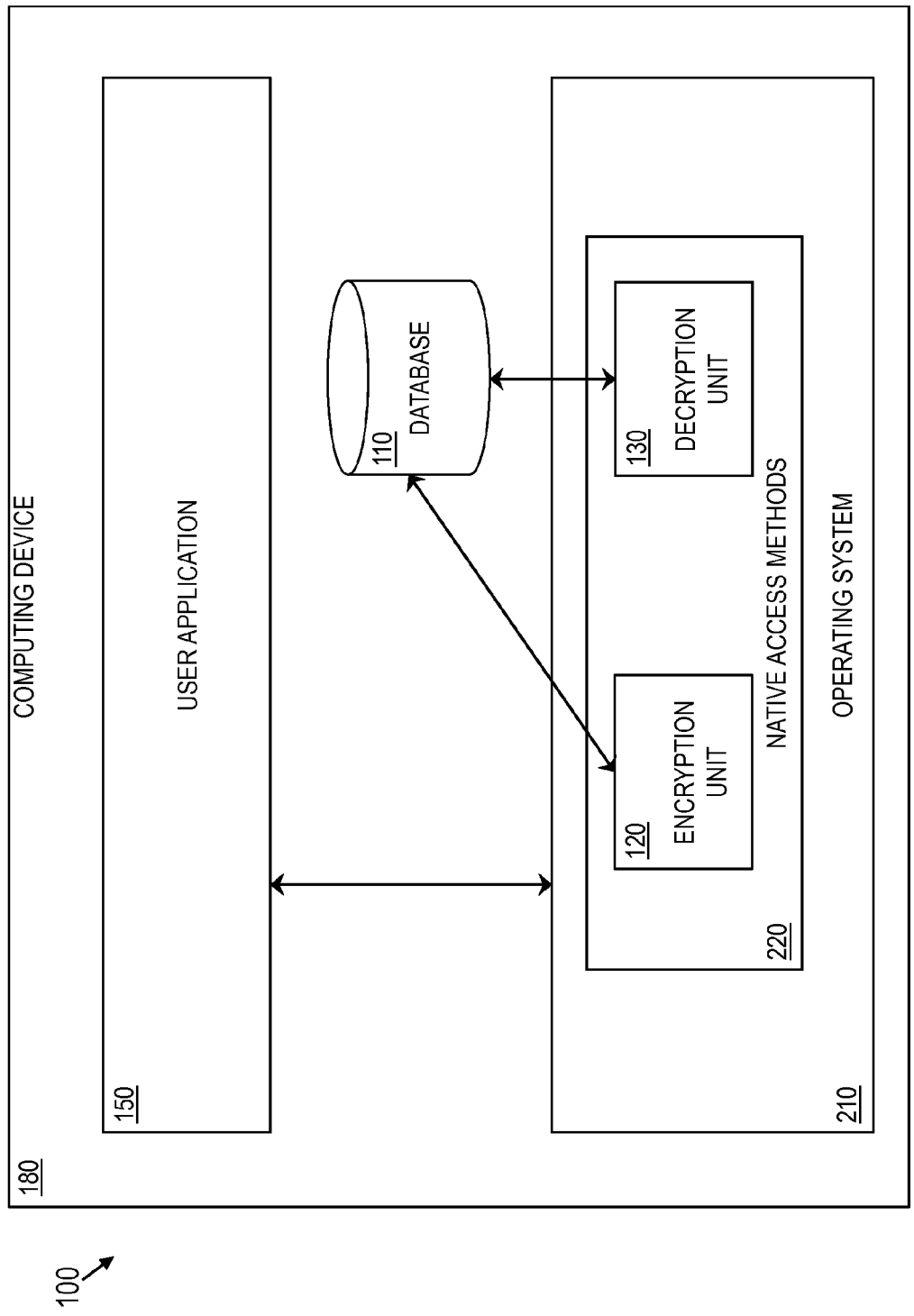
FIG. 2 is a block diagram of the encryption system, according to some other embodiments of this disclosure.

FIG. 2 is a block diagram of the encryption system 100, according to some other embodiments of this disclosure. As shown in FIG. 2, the encryption and decryption units 120 and 130 of the encryption system 100 may be implemented natively, in the operating system 210 of the computing device 180. Native access methods 220 of the operating system 210 may perform the encryption or decryption as needed when using the database. Because calls to the database 110 go through the operating system 210, the native access methods 220 may perform encryption before writing data to the database 110 on behalf of an application, and may perform decryption when reading data from the database 110 on behalf of an application. Both the database 110 and the user application 150 may be blind to the encryption and decryption, and may behave as if no encryption is taking place.

Figure 3:
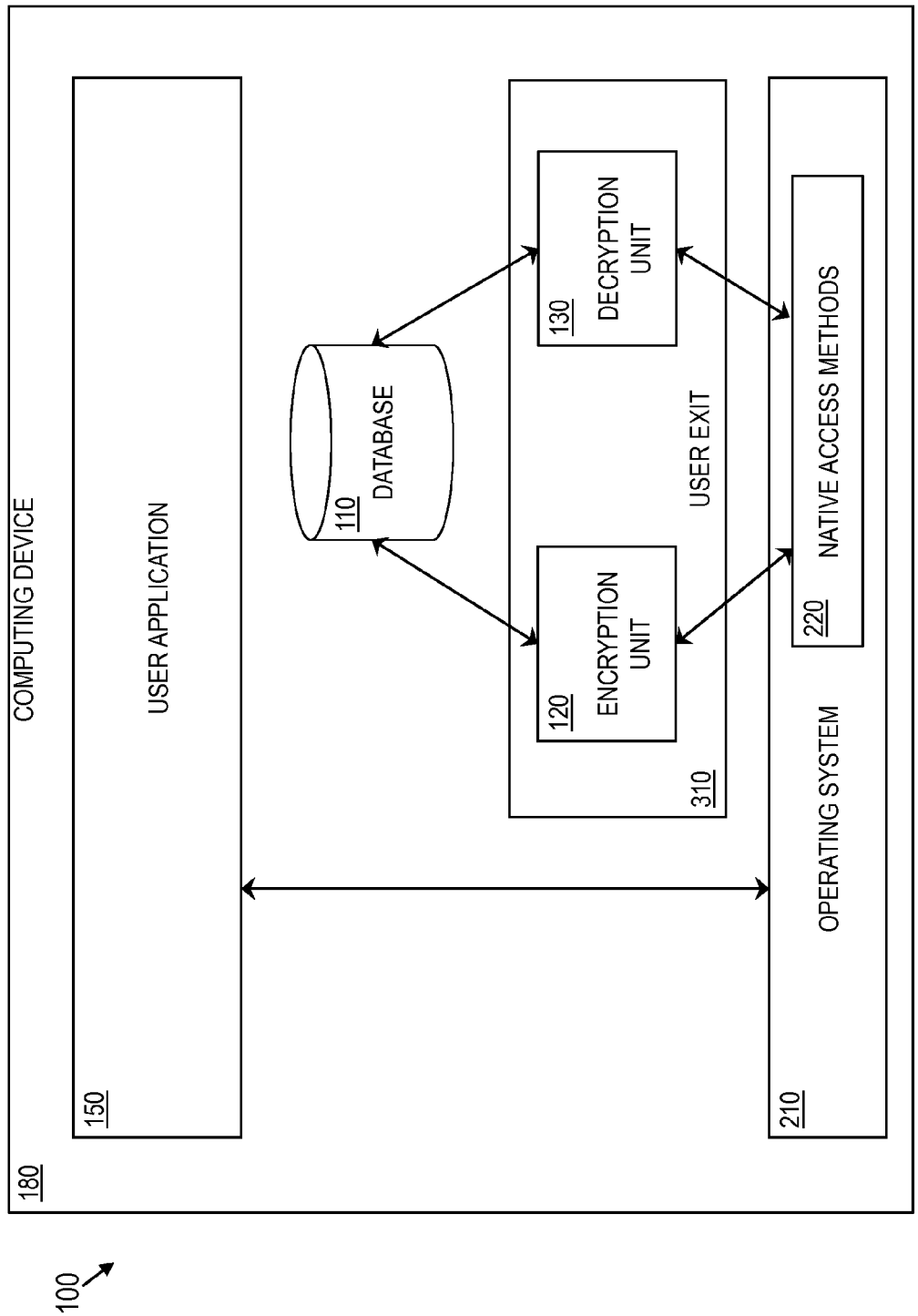
FIG. 3 is a block diagram of the encryption system, according to still other embodiments of this disclosure.

FIG. 3 is a block diagram of the encryption system 100, according to still other embodiments of this disclosure. As shown in FIG. 3, the encryption and decryption units 120 and 130 of the encryption system 100 may be implemented as part of user exits 310, which are non-native functions added to the operating system 210. Native access methods 220 may call these user exits 310 to encrypt data before writing to the database 110 on behalf of a user application 150, and to decrypt data after reading from the database 110 on behalf of a user application 150. Again, in this case, both the database 110 and the user application 150 may be blind to the encryption and decryption, and may behave as if no encryption is taking place. Further, the native access methods 220 may be unaware of the encryption and decryption being performed by the user exits 310.

It will be understood that FIGS. 1-3 are illustrative examples of how the encryption system 110 may be implemented. These figures do not limit the various embodiments of the encryption system 100.

The encryption unit 120 may encrypt data using VFPE or another FPE method. According to some embodiments, however, each sensitive field of the database 110 may be encrypted with a unique encryption subkey for the row containing the sensitive field, based on a static key that is common across the rows. Further, the encryption subkey used for each row may be further based on key derivation data found in that row. As a result, the encryption subkeys of the database's various rows need not be stored in addition to the existing content of the database 110, because the encryption subkeys are derivable from the row data and the shared static key.

The encryption system 100 may use a single static key for the database 110 as a whole or for each table, or other logical portion, of the database 110. The static key may be the same across various rows of the database 110 and may be known to the encryption unit 120 and the decryption unit 130. In contrast, the key derivation data for each row need not be stored by the encryption and decryption units 110 and 120 and may instead be extracted from the database rows as needed.

For each row, the unique encryption subkey may be based on the static key and key derivation data found in the row. In some embodiments, the key derivation data may be a combination of the row's primary index and modification time. Each row of the database 110 may include a primary index, which may act as an identifier for that row. For example, if each database row represents a person, then the primary index may be a field for the person's account number or email address. In general, the primary index for each row may be unique, shared with no other row. Each database row may also include a modification time, which may indicate the date and time (e.g., down to the second) that the data in that row was last changed. The encryption system 100 may combine each row's primary index and modification time into key derivation data, which may be further combined with the static key to create the unique encryption subkey for the row. In other words, a row's encryption subkey may be a combination of the static key, the primary index for the row, and the modification time for the row. Both the primary index and the modification time are common inclusions in database rows, and thus, a database 110 need not be modified to enable encryption according to this disclosure.

The mechanism of combining the static key and the key derivation data into an encryption subkey may vary based on implementation. For example, and not by way of limitation, in some embodiments, the key derivation data may be encrypted with the static key, with the resulting ciphertext being used as the encryption subkey. In some other embodiments, the static key and the key derivation data for a row may be concatenated to produce the encryption subkey, or the static key and the key derivation data may be combined using exclusive OR (XOR) logic to produce the encryption subkey. It will be understood that other mechanisms for combining these values are also within the scope of this disclosure.

It will be understood that the use of the primary key and modification time as a basis for a row's encryption subkey is illustrative only. In some other embodiments, other data determinable from fields in the row may be used as the key derivation data instead of, or in addition to, the primary key and the modification time. However, the use of the primary key may ensure uniqueness among the various rows, while the use of the modification time may cause the encryption subkey to change every time the row data requires encryption, thus further increasing security. When using the modification time as part of the key derivation data, the encryption system 100 may be careful to re-encrypt the row data whenever any data on that row changes, such that the modification time for the row is changed. A change in the modification time would change the encryption subkey determined by the decryption unit 130, and thus, the encryption system 100 may ensure that the encrypted data uses the correct encryption subkey by re-encrypting the data whenever a change to the row is made. Further, for the same reasons, the encryption unit 120 may re-encrypt the row data when another field used in the key derivation data is changed. For example, if a row's primary index changes, when the primary index is part of the key derivation data, the encryption system 100 may re-encrypt all encrypted data on that row.

Because each encryption subkey may be based on row data that is unique for the applicable row, the encryption subkey may likewise be unique for each row. Further, in some embodiments, the encryption subkey for a row cannot be known without knowledge of both the static key and the key derivation data. While the key derivation data is determinable from the row data in the database 110, the static key may be maintained as a secret in the encryption unit 120 and the decryption unit 130. Thus, a malicious attacker will be unable to decrypt the data in the database 110 simply by extracting the key derivation data from the database 110.

When encrypting data to be stored in a row of the database, the encryption unit 120 may extract the key derivation data from the row, combine the key derivation data with the static key, and thereby generate an encryption subkey for the row. The encryption unit 120 may encrypt one or more sensitive fields in the row using the generated encryption subkey, and may store the resulting ciphertext in the database 110. When the encryption unit 120 needs to encrypt multiple rows, the encryption unit 120 may perform these actions for each row, generating a unique encryption subkey for each row, and storing the resulting data for the various rows in the database 110.

To enable the decryption unit 130 to determine the key derivation data and, therefore, the encryption subkey for each row, the encryption unit 120 may leave unencrypted the fields of the database 110 used for the key derivation data. In other words, the one or more fields making up the key derivation data may be deemed to not be sensitive fields requiring encryption. It is generally not a security risk to leave the primary key and the modification time unencrypted, as these fields are not likely to hold confidential data. Further, it is common for the primary key to remain unencrypted, because access to the plaintext version of the primary key is necessary when identifying rows in the database 110 for processing.

When decrypting data that has been read from a row of the database 110, the decryption unit 130 may extract the key derivation data from the row. As described above, that key derivation data may be the primary key along with the modification time. This key derivation data may be combined with the static key to determine the encryption subkey, which is the same encryption subkey used to encrypt the data in the row. The decryption unit 130 may decrypt the previously encrypted sensitive fields in the row using the encryption subkey, and may communicate the decrypted data to the user application 150 or other component that requested the data from the database 110. When the decryption unit 130 needs to decrypt multiple rows, the decryption unit 130 may perform these actions for each row, determining the encryption subkey for each row, and decrypting each row with the applicable subkey.

Figure 4:
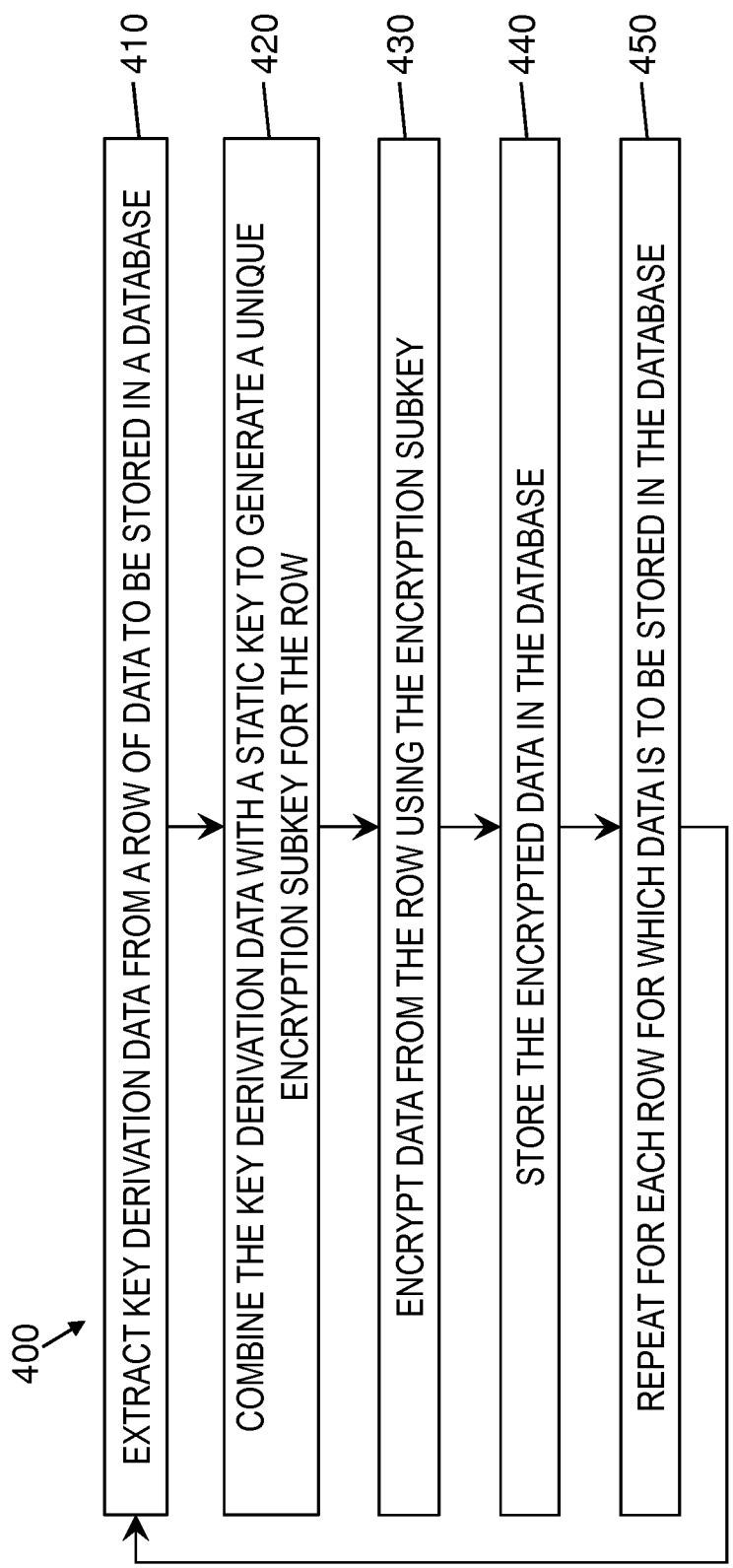
FIG. 4 is a flow diagram of a method for encrypting data in a database, according to some embodiments of this disclosure.

FIG. 4 is a flow diagram of a method 400 for encrypting data in a database 110, according to some embodiments of this disclosure. As shown, at block 410, key derivation data may be extracted from a row of the data to be encrypted and stored in the database 110. At block 420, the key derivation data may be combined with a static key to generate an encryption subkey unique to the row. At block 430, the sensitive data in the row may be encrypted using the encryption subkey. Various encryption algorithms may be used, including, for example, VFPE. At block 440, the row, including its encrypted sensitive fields, may be stored in the database. At block 450, the method 400 may start over at block 410 with a new row if encryption and storage of additional rows is needed.

Figure 5:
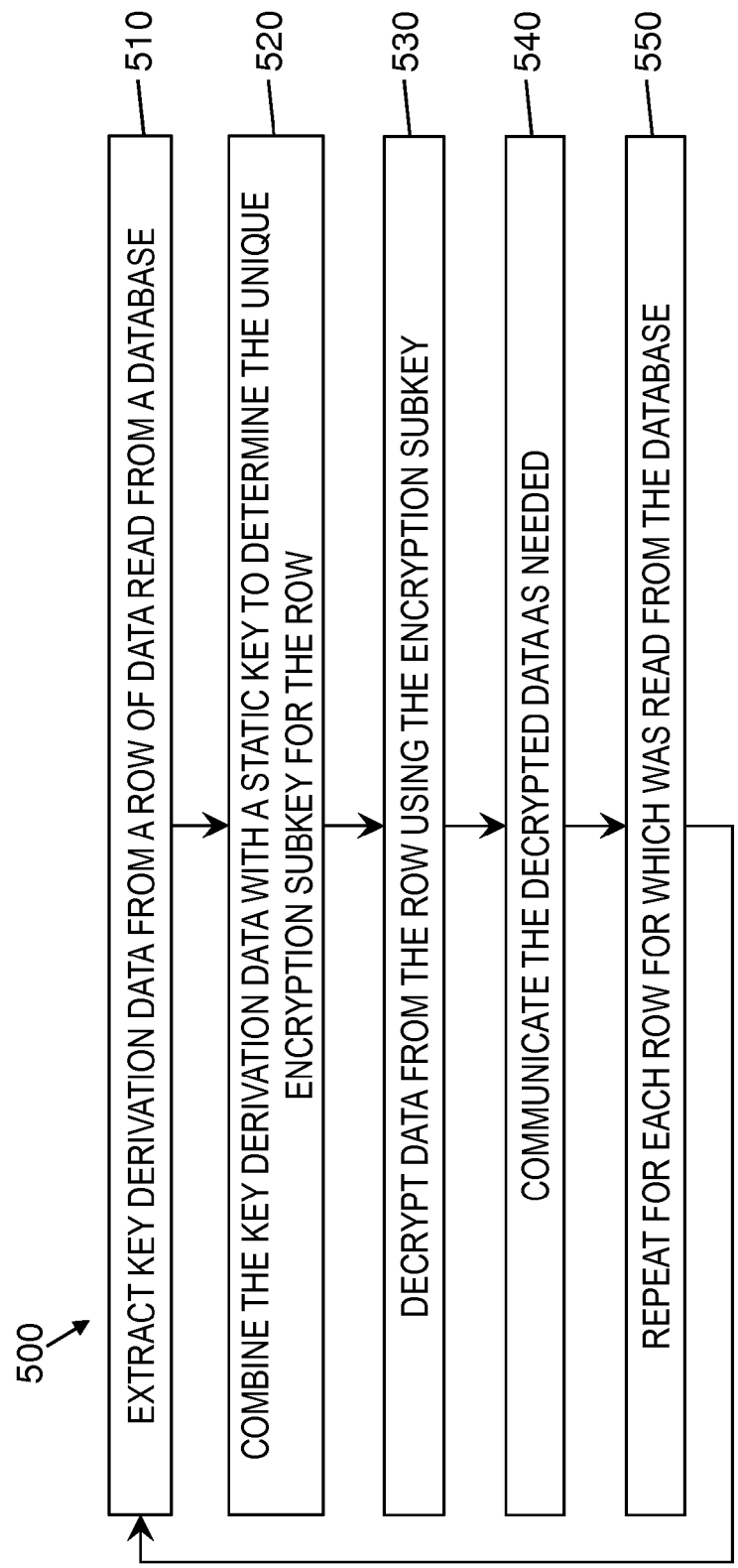
FIG. 5 is a flow diagram of a method for decrypting data from a database, according to some embodiments of this disclosure.

FIG. 5 is a flow diagram of a method 500 for decrypting data from the database 110, according to some embodiments of this disclosure. As shown, at block 510, key derivation data may be extracted from a row of the data read from the database 110. At block 520, the key derivation data may be combined with a static key to determine the encryption subkey unique to the row. At block 530, the encrypted sensitive fields of the row may be decrypted using the encryption subkey. Various decryption algorithms may be used, including, for example, VFPE, as long as the decryption algorithm used is the same as the encryption algorithm being used. At block 540, the decrypted data may be communicated to the user application 150 or other component requesting the data. At block 550, the method 500 may start over at block 510 with a new row if decryption of additional rows is needed.

It will be understood that FIGS. 4-5 are illustrative examples of encryption and decryption methods. Other methods are also within the scope of this disclosure.

Figure 6:
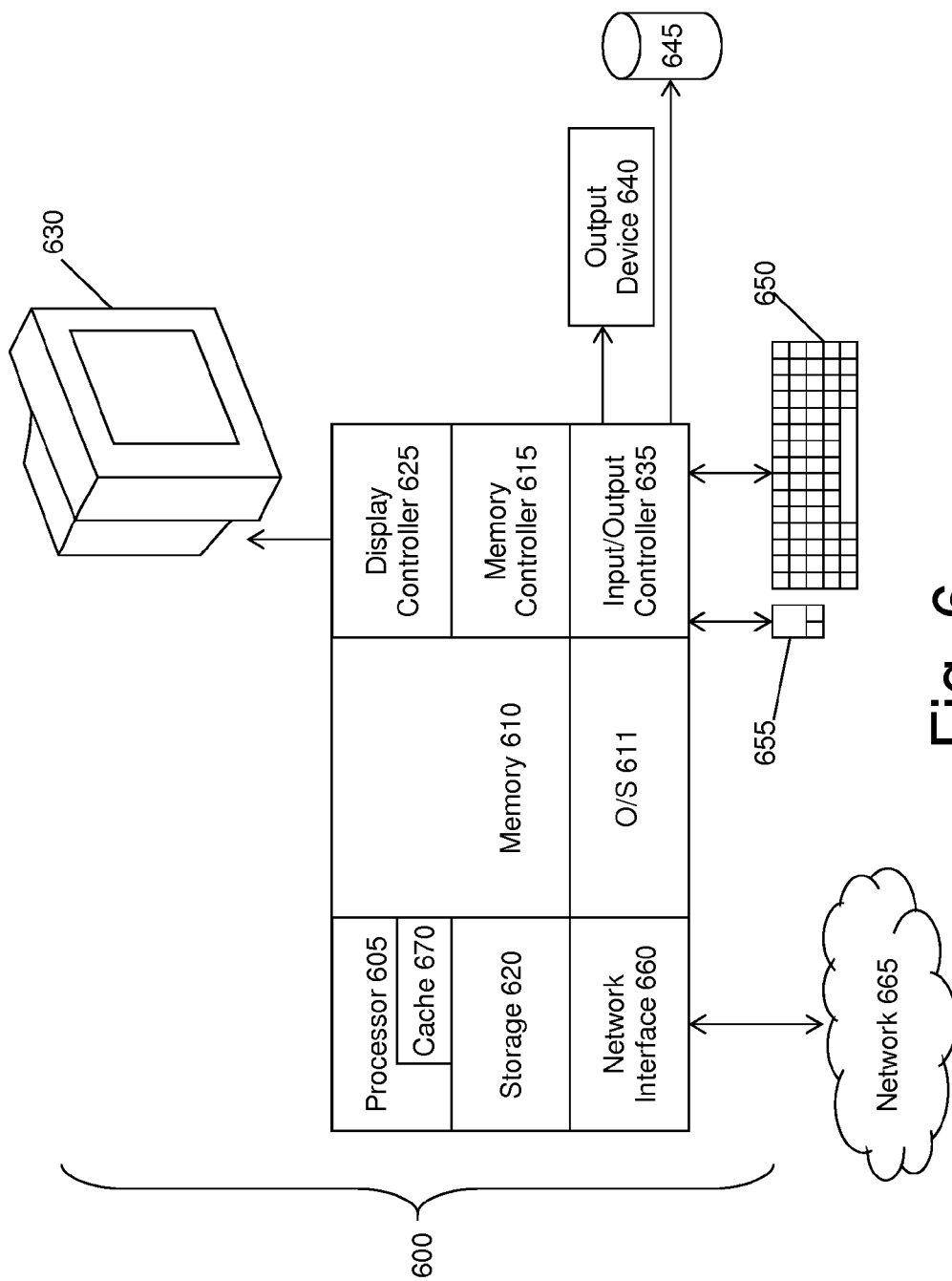
FIG. 6 is a block diagram of a computing device for implementing some or all aspects of the encryption system, according to some embodiments of this disclosure.

FIG. 6 illustrates a block diagram of a computer system 600 for use in implementing an encryption system or method according to some embodiments. For example, the computing device 180 depicted in FIGS. 1-3 may be a computer system 600 such as that shown in FIG. 6. The encryption systems and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services. In some embodiments, the operating system 611 may be the same as the operating system 210 shown in FIGS. 2-3, and may be involved in encrypting and decrypting data for the database 110.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the encryption systems and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Encryption systems and methods according to this disclosure may be embodied, in whole or in part, in computer program products or in computer systems 600, such as that illustrated in FIG. 6.

Technical effects and benefits of some embodiments of the encryption system 100 include being able to use a fast FPE mechanism, such as VFPE, on a database 110, while using a unique encryption key/IV pair for each row of the database 110. As a result, the encryption system 100 may provide database encryption that is both fast and secure, without changing the form or character of data in the database 110.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

extracting first key derivation data from one or more fields in a first row of data to be stored in a database, wherein the database comprises two or more rows of data;

generating, by a computer processor, a first encryption subkey by combining the first key derivation data with a static key;

encrypting one or more sensitive fields in the first row of data with format-preserving encryption using the first encryption subkey, wherein the one or more fields in the first row of data that are used for the first key derivation data remain unencrypted;

storing the first row of data, comprising the encrypted one or more sensitive fields, in the database, wherein the first encryption subkey is not stored in the database;

wherein one or more sensitive fields in each of the two or more rows of the database are encrypted using a respective unique encryption subkey for the row, and wherein the respective unique encryption subkey for each row is based on the static key and on a respective key derivation data for the row, wherein the respective key derivation data comprises a combination of a primary key of the row and a modification time of the row and wherein the primary key and modification time are unencrypted;

detecting a modification to the one or more fields of the first row used for the first key derivation data; and re-encrypting the one or more sensitive fields of the first row, based on modified key derivation data in the one or more fields of the row used for the first key derivation data, responsive to the modification of the one or more fields used for the first key derivation data.

2. The method of claim 1, further comprising:

reading the first row of data from the database;

extracting the first key derivation data from the first row of data;

determining the first encryption subkey by combining the first key derivation data with the static key; and decrypting the encrypted one or more sensitive fields in the first row of data using the first encryption subkey.

3. The method of claim 1, wherein generating the first encryption subkey by combining the first key derivation data with the static key comprises encrypting the first key derivation data with the static key.

4. The method of claim 1, wherein the first row of data excludes the static key and comprises the first key derivation data.

* * * * *